No. 746,361. PATENTED DEC. 8, 1903.
J. F. McELROY.
ELECTRIC LIGHTING SYSTEM.
APPLICATION FILED OCT. 6, 1902.
NO MODEL. 2 SHEETS—SHEET 2.

No. 746,361. Patented December 8, 1903.

UNITED STATES PATENT OFFICE.

JAMES F. McELROY, OF ALBANY, NEW YORK, ASSIGNOR TO CONSOLIDATED CAR HEATING COMPANY, OF ALBANY, NEW YORK, A CORPORATION OF WEST VIRGINIA.

ELECTRIC-LIGHTING SYSTEM.

SPECIFICATION forming part of Letters Patent No. 746,361, dated December 8, 1903.

Application filed October 6, 1902. Serial No. 126,012. (No model.)

*To all whom it may concern:*

Be it known that I, JAMES F. McELROY, a citizen of the United States, residing at Albany, county of Albany, and State of New York, have invented certain new and useful Improvements in Electric-Lighting Systems, of which the following is a specification, which, with the accompanying drawings, discloses as an illustration of my invention that form thereof which I now regard as the best out of the various forms in which the principles of my invention may be applied.

Figure 1:
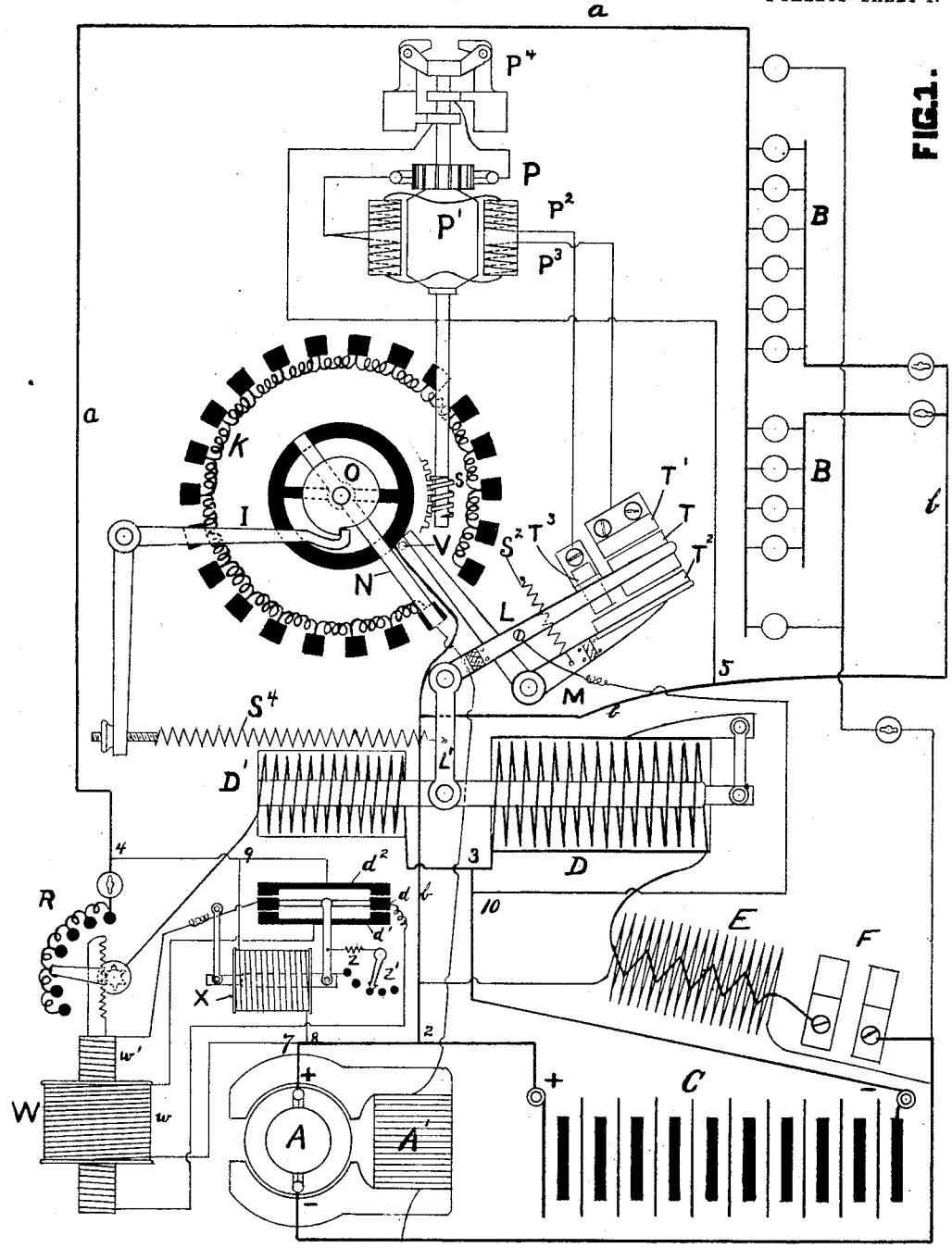
Figure 2:
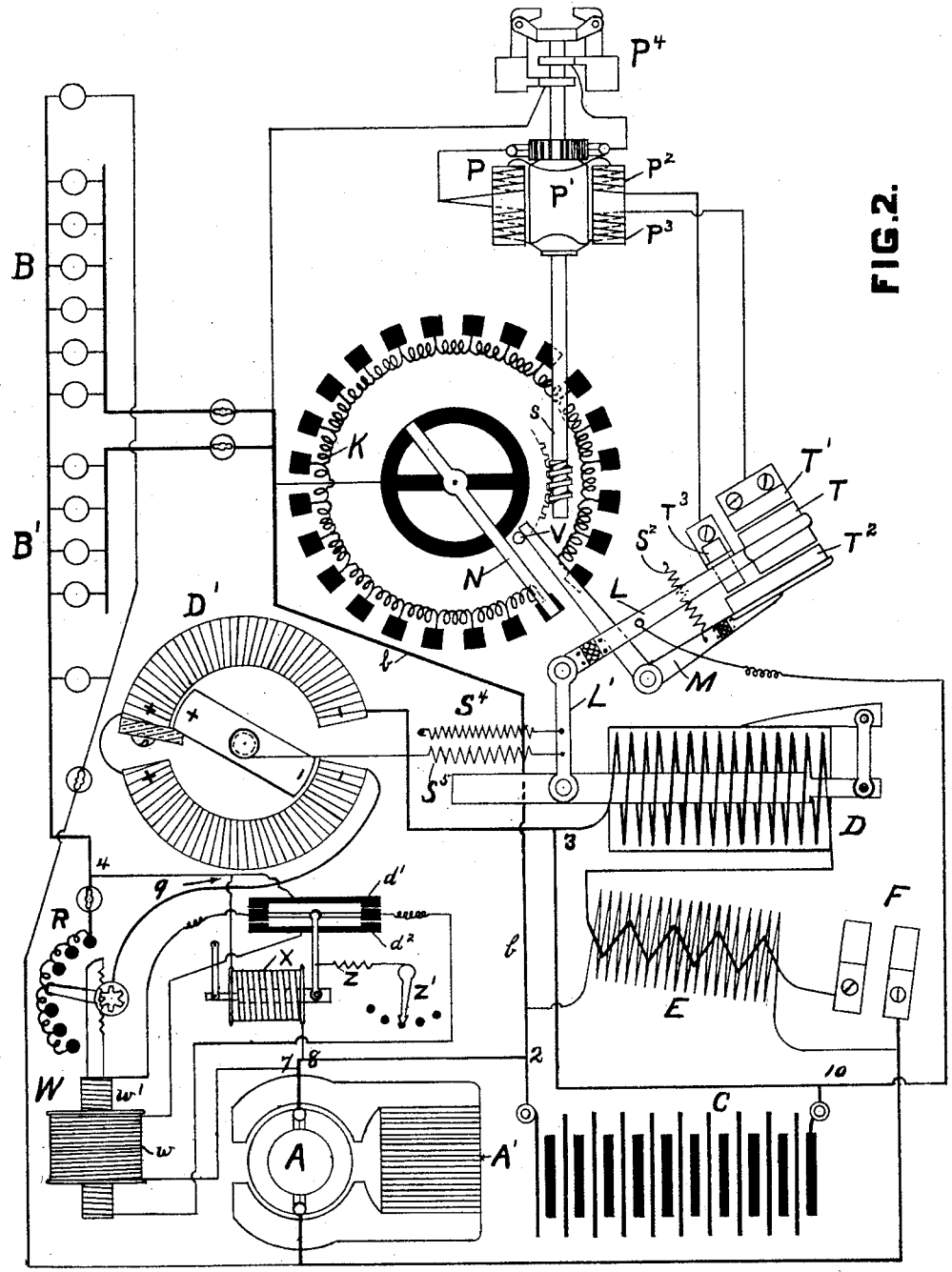

In the accompanying drawings, Figure 1 is a general diagram of my invention, and Fig. 2 is a diagram of a modified form of the same.

My invention relates to an electric-lighting system in which the generator is driven at variable and intermittent speeds—as, for instance, by the axle of a railway-train.

The lighting of railway-trains is the particular purpose for which the invention is designed.

In systems of this general character it is customary to provide a storage battery, which will be charged by the generator and utilized to operate the lamps when the generator is standing still or running at a low speed. Moreover, the regulation of the generator has been accomplished by means of a determining-magnet measuring the requirements of the circuit and governing the output of the generator in a manner to meet such requirements.

My invention is illustrated herein by its application to a system in which the governing-magnet for the regulator is a series magnet included, preferably, in the main circuit, so as to receive the entire current generated by the dynamo, including that which goes to the battery as well as that which goes to the lamps connected in multiple with the battery. With this arrangement some means must be provided for controlling the distribution of the current between the battery and the lamps if the dynamo is of a capacity adequate for charging the battery simultaneously with its operation of the lamps, and a generator of this kind is required if the system is to be capable of meeting all the practical requirements of actual service. In the present instance I provide means for modifying the action of the governing-magnet aforesaid in response to the current demands of the lighting-circuit. Instead, therefore, of a constant current, such as would otherwise be maintained by the series-governing magnet, I secure a constant current modified in value from time to time and provide for its proper distribution between the battery and the lamps.

Other arrangements embodying the same general principle of a governing-magnet responding to the conditions of both branches, but modified by a coil included in series with one of the branches, may be employed.

Referring to Fig. 1 of the accompanying drawings, A is the generator, which is assumed to be driven at variable speeds, and F is the main switch, operated by the compound magnet E and serving in a manner already understood in the art to close the main circuit when the speed of the dynamo reaches a predetermined point—for example, when the train speed is fifteen miles per hour, in event of the dynamo being operated by an axle of the train. A' is the field-magnet of the dynamo, and D is the governing-magnet, in series with the dynamo and also with both lamps and battery. The main circuit starting from the positive brush of the dynamo goes to the branching point 2 and then divides, one part going through the battery C and meeting the other branch at the point 3, while the other branch starting from point 2 passes by the wire $b$ to the lamp groups B and B' and then returns by the wire $a$ to the rheostat R, going thence to the opposition magnet D' and thence to the meeting-point 3. From the point 3 the entire current goes through the governing-magnet D, thence through the switch-magnet E and the switch F back to the negative brush of the dynamo. The lamps thus constitute a set of translating devices in one branch and the battery-cells a second set of translating devices in a second branch of the dynamo-circuit. Assuming that the governing-magnet D acting through suitable agencies will control the regulator, which in turn determines the output of the dynamo, it will be understood that the said magnet D would naturally maintain a fixed and definite flow of current in the circuit. Such an arrangement is, in fact, employed in systems which do not undertake to simultaneously charge the battery and operate the lamps, the constant current being delivered to the battery during the day runs and to the lamps during the night runs, thus operating the lamps and battery alternately, while the battery acts during the night runs to feed the lamps in conjunction with the dynamo and to act as a sole source of electromotive force when the dynamo is not running or running below a predetermined speed. In my apparatus, however, I purpose to simultaneously charge the batteries and operate the lamps, the dynamo having to this end a capacity adequate for both demands. In such cases it is manifest that some means be employed to compensate for the variations in the number of lamps on the one hand and in the counter electromotive force of the battery due to the condition of its charge on the other hand. I therefore include in the branch circuit extending to the lamps an opposition magnet D', exerting its pull in a direction contrary to that of the magnet D. This serves to modify the action of the latter magnet. Thus when no current is flowing to the lamps the magnet D' being then inactive the magnet D will have a greater pull per ampere of current delivered to it—that is to say, a smaller amount of current will enable it to exert a given effect upon the regulator, which in turn will act to maintain constant the said smaller amount of current in the circuit. Since the circuit under the conditions just assumed contains only the storage battery, the latter will be charged by a constant current delivered thereto from the dynamo. On the other hand, if the lamps are turned on wholly or partly a corresponding amount of current will flow through the opposition magnet D' and the governing-magnet D will require a greater amount of current in order to exert a given effect upon the regulator, which greater amount of current will be maintained constant throughout the circuit so long as the conditions remain constant, but will be increased or decreased in correspondence with the variations in lamp demands. The magnet D' measures the lamp-current, as distinguished from a magnet which simply acts once when adequate current flows irrespective of the amount of such current.

Turning to the regulating apparatus governed by the magnet D, which apparatus is not claimed herein as a part of the present invention, K is a rheostat, more or less of whose resistance is included in the field-magnet circuit of the dynamo, so as to increase or decrease the current strength in the field-magnet circuit, and thereby increase or decrease the output of the dynamo. The rheostat-arm N is operated by a motor P through the agency of a screw $s$ or other mechanical transmitting device, and the motor P is in turn controlled directly by the magnet D. Thus the motor P has its armature P' provided with two oppositely-wound field-magnets $P^2$ and $P^3$, each contained in a separate branch of the motor-circuit and each giving to the motor when energized a different direction of rotation. Thus the motor will turn in one direction or the other, according as its circuit is completed through one or the other of the two field-magnet coils $P^2$ and $P^3$. The motor-circuit starts from the point 10 of the battery branch and goes thence to the arm L of an angle-lever, whose opposite arm L' is joined directly to the core of the governing-magnet D. The motor-current then passes along the arm L to a contact T at its outer extremity, which contact vibrates between contact T', connected to the motor field-magnet $P^3$, and contact $T^2$, connected to the motor field-magnet $P^3$, through the circuit-breaking contact $T^3$ whenever such contact rests against the contact $T^2$, as it does so long as the apparatus is working. The motor-circuit after passing through one or the other of the two field-magnets in the manner aforesaid goes to the armature P', thence to the motor-governor $P^4$, and returns to the wire $b$, leading to the opposite battery-terminal at the point 5. By this arrangement the governing-magnet D will act upon any departure from the normal amount of current in its coils to close the motor-circuit by bringing the contact T into engagement with the contact T' or the contact $T^2$, which will cause the motor to rotate in one direction or the other and so increase or decrease the amount of resistance K in the field-magnet circuit, which in turn acts to increase or decrease the current, so as to correct the departure from the normal amount, which departure has been the cause of action of the governing-magnet. When the current is restored to the normal value, the contact T assumes its normal position midway between T' and $T^2$.

The regulator-motor P, as above mentioned, is supplied, not from the dynamo A, but from the battery C, the object of this being to insure the operation of the motor in the event of the accidental rupture of the dynamo-circuit by the blowing of the fuse or other emergency. In such an occurrence the battery will continue to supply current to the motor, and the motor will run until it brings the apparatus to the "off" or neutral position appropriate for the condition of an interruption in the dynamo-circuit, whether such interruption is a normal one, due to the operation of the main switch F, or an abnormal one, due to the blowing of a fuse by an accident. In order, however, that the battery-current shall not be left closed through the motor after the duty of the motor has been performed, I provide for breaking the motor-circuit by the separation of the contact $T^2$ from the contact $T^3$ whenever the apparatus comes to rest in the off position. For this purpose the contact T² is mounted upon the outer end of a lever-arm M, the opposite arm thereof being located in the path of a pin V on the rheostat, which when the rheostat comes to its off position throws the contact T² out of engagement with the contact T³ against the force of the spring S², tending to hold the said contacts together. When the rheostat starts from its off position, it releases the lever-arm M and allows it to respond to the tension of the spring S², and so restore the engagement of the contact T² with the stationary contact T³. It should be remembered that this interruption of the motor-circuit only occurs in the branch containing the field-magnet coil P², which is the one that gives the motor its direction appropriate for bringing the rheostat into the off position. The branch circuit through the other field-magnet circuit of the rheostat-motor is not so interrupted and will be closed by the engagement of the contacts T and T' whenever the magnet D is energized by a closure of the main switch F and the flow of an adequate current occurs. The motor will then start and will operate the rheostat in a reverse direction—viz., in a direction to include resistance K with the field-magnet circuit—so as to reduce the excessive current which started the motor, releasing at the same time the lever M, so as to close the opposite field-magnet circuit of the rheostat-motor through field-coil P³, preparatory to the reverse rotation of the motor whenever the main current falls in value to a sufficient degree to permit the governing-magnet D to allow the contact T to come into engagement with the opposite contact T².

To facilitate the starting of the regulator to meet the acceleration of the train, the retractile spring S⁴ of the magnet D has its tension slightly released when the apparatus is in the off position, being for this purpose attached to one end of angle-lever I, whose opposite end bears upon the periphery of a cam O on the shaft of the rheostat. When the apparatus is in the off position, the arm of this lever rests upon the depressed portion of the cam, but immediately upon the starting of the apparatus is lifted to the circular portion of the cam, which movement first increases the tension upon the spring S⁴ and then maintains it unchanged during the further run of the rheostat.

In order to regulate the above-described action of the opposition magnet D', I provide a shunt-magnet X, included in the branch circuit around the lamps inside of the resistance R, so that it may measure the pressure or potential applied to the lamps. This magnet X operates a director which controls the direction of current in the armature w' of a motor W, whose field-magnet is represented by the solenoid w, and this motor W in turn operates a rheostat R in series with the lamps. The circuit of the magnet X starts from the point 8 near the positive brush of the dynamo, and going through the coils of the magnet to the point 9 passes thence to the opposite side of the circuit to the point 4. The circuit of field-magnet w of the motor W starts from the point 7 near the positive brush of the dynamo and goes thence to the arm d' of the director, whence, according to the position of the intermediate arm d of the director, it passes in one direction or the other through the armature w', and thence to the upper arm d² of the director. From there it goes to the opposite side of the circuit at the point 4. The tension of the retractile spring Z of the magnet X may be adjusted by means of the pointer Z', upon whose shaft is wound a cord leading from the rear end of the spring Z. By this device the brilliancy of the lamps may be adjusted to the extent of dimming them in the manner required in a sleeping-car at night—that is to say, if the tension of the spring Z is low the shunt-magnet X will respond to a much lower potential and maintain that potential or electromotive force upon the lamps, while when the tension of the spring is increased a higher potential is required to cause the operation of the magnet X, which higher potential will in like manner be maintained. Whenever the magnet X operates, whether set for a high or a low potential, it closes the circuit of the motor W in one direction or the other, which, in turn, operates the rheostat R to decrease the resistance in series with the lamps if the potential is too low or increase it if the potential is too high. Remembering that a fixed amount of current is available for division between the battery and the lamps, it will be manifest that such current will divide between lamps and battery branches inversely as the resistance of such branches, respectively, and that when the lamp branch has its resistance increased by the addition of a portion of the resistance R it will take a smaller quota of the said available current; but when its resistance is decreased by a withdrawal of a portion of the said resistance R it will take a larger quota of the said current, the battery in each case taking what is left, according to its resistance. Thus it appears that magnet X, with the motor and resistance which it controls, constitutes a distributer to divide or proportion the current between lamps and battery, while the amount of current to be divided is determined by the differential action of the two series magnets—to wit, magnet D in series with both lamps and battery and opposition magnet D' in series with the lamps alone.

In Fig. 2 the magnet D' takes the form of two curved bars, each extending over nearly a semicircle with a rotating polarized armature inclosed within them. These bars are wound with coils included in series with each other and with the lamps, a north pole being formed on one side, as indicated by the plus-sign and a south pole on the other side, as indicated by the minus-sign. On the shaft of the armature is wound a cord connected to lever-arm L' through a spring S⁵. When current passes, the armature tends to set itself in a position where its north and south poles will be respectively opposite the south and north poles of the magnet. This tends to wind up the cord and increase the tension of spring S⁵. The effect of the opposition magnet D' is thus the same in principle as that of the corresponding magnet in Fig. 1.

In another pending application I have shown and claimed the lamps as divided into groups, each group containing a magnet which when energized adds a certain degree of tension to the retracting-spring of the regulator-magnet. In the present device, however, the addition or removal of individual lamps or small numbers of lamps will serve to modify the regulation effected by the main magnet. In other words, the opposition magnet measures the lamp-current, and causes the regulator to draw from the dynamo the proper amount of current, the limit being set by the shunt-magnet X. I have also claimed in other applications the regulation apparatus which is here shown, for purposes of illustration, as subjected to the control of magnets arranged in the manner which constitutes the matter of the claims herein made.

What I claim as new, and desire to secure by Letters Patent, is—

1. In an electric-lighting system, the combination with electric lamps and a storage battery in separate multiple-arc branches respectively, of a dynamo charging the storage battery and simultaneously operating the lamps, a regulator for the dynamo, a magnet controlling the said regulator, its coils receiving both the lamp and the battery current and an opposing magnet in the lamp branch measuring the lamp-current.

2. In an electric-lighting system, the combination with electric lamps and a storage battery in separate multiple-arc branches respectively, of a dynamo charging the storage battery and simultaneously operating the said lamps, a constant-current regulator therefor and a series magnet in the lamp branch measuring the lamp-current and connected to the said regulator to modify its action in accordance with the value of the lamp-current.

3. In an electric-lighting system the combination with electric lamps and a storage battery in separate multiple-arc branches respectively, of a dynamo charging the battery and simultaneously operating the lamps, a regulator for the dynamo, a magnet controlling the regulator and a second magnet measuring the lamp-current and acting on the said regulator in opposition to the first-named magnet.

4. In an electric-lighting system the combination with electric lamps and a storage battery in separate multiple-arc branches respectively, of a dynamo charging the battery and simultaneously operating the lamps, a regulator for the dynamo, a regulator-magnet having its core connected to the regulator-controller, and a second magnet having its core also connected to said controller and its coils connected to the lamp-circuit so as to measure the current therein.

5. In an electric-lighting system the combination with electric lamps and a storage battery in separate multiple-arc branches respectively, of a dynamo charging the battery and simultaneously operating the lamps, a constant-current regulator therefor, a magnet controlling the regulator, an opposition magnet measuring the lamp-current, a resistance in the lamp branch and a third magnet measuring the lamp-potential and controlling the said resistance.

6. In an electric-lighting system the combination with electric lamps and a storage battery in separate multiple-arc branches respectively, a dynamo charging the battery and simultaneously operating the lamps, a constant-current regulator for the dynamo, a controlling-magnet therefor, a current-measuring magnet in the lamp branch acting in opposition to the controlling-magnet and a distributer for the current proportioning it between the lamps and battery according to the relation of the counter electromotive force of the battery to the applied electromotive force on the lamps.

7. In an electric-lighting system the combination of electric lamps and a storage battery in separate multiple-arc branches respectively, a dynamo charging the battery and simultaneously operatng the lamps, a regulator for the dynamo, a series magnet controlling the regulator, a second series magnet in the lamp branch acting differentially to the first-named magnet, a shunt-magnet connected across the lamp-circuit, an adjustable resistance in series with the lamps and a motor controlling said resistance and controlled by the said shunt-magnet.

8. In an electric-lighting system, the combination with electric lamps and a storage battery in separate multiple-arc branches respectively, of a dynamo therefor driven intermittently and at a variable speed, a regulator for the dynamo, a series magnet controlling the said regulator and carrying in its coils both the lamp and battery current, an adjusting-magnet therefor acting in opposition to and measuring the lamp-current, an adjustable resistance in the lamp branch, a motor therefor and a shunt-magnet connected across the lamp-circuit and controlling the motor.

9. The combination in an electric-lighting system of lamps and a storage battery in separate multiple-arc branches, respectively, a dynamo, a constant-current regulator therefor, a controlling-magnet for the regulator and an opposition magnet in the lamp-circuit having its core mechanically continuous with the core of the controlling-magnet.

10. The combination in an electric-lighting system of lamps and a storage battery in separate multiple-arc branches respectively, a dynamo therefor, a regulator for the dynamo, a motor operating the regulator, a magnet carrying both the lamp and battery currents and controlling the circuit of said motor, a differential opposing magnet in the lamp-circuit in series with the lamps, and a distributer for proportioning the current between lamps and battery comprising an artificial resistance, a motor therefor and a shunt-magnet controlling said motor.

11. In an electric-lighting system the combination with electric lamps and a storage battery in separate multiple-arc branches respectively, of a dynamo therefor, a constant-current regulator for said dynamo, a resistance in the lamp branch, a shunt-magnet measuring the lamp potential and controlling said resistance and a manual adjuster for increasing or decreasing the lamp potential.

12. The combination in an electric-lighting system, of lamps and a storage battery in separate multiple-arc branches, a variable-speed dynamo therefor, a regulator for the dynamo, a governing-magnet for the regulator responding to the requirements of both branches, and a modifying-coil for said magnet in series with one of the branches.

13. The combination with a variable-speed dynamo of lamps and a storage battery connected thereto in multiple, a regulator for the dynamo, a series magnet in the unbranched portion of the main circuit controlling said regulator and a distributing-regulator adjusting the resistance of the lamp branch in correspondence with the changes in the resistance of the battery branch.

14. The combination with a variable-speed dynamo of a series regulator-magnet therefor in the unbranched portion of the dynamo-circuit, lamps and a storage battery in multiple, a variable resistance in the lamp branch and a magnet shunting the lamps and controlling the said resistance.

15. The combination with a variable-speed dynamo, of a series regulator-magnet therefor in the unbranched portion of the dynamo-circuit, lamps and a storage battery in multiple, and a distributing-regulator comprising a magnet measuring the lamp potential, a resistance in the lamp branch adequate to equalize any difference between lamp and battery potential and operating connections between said magnet and resistance.

16. The combination with a variable-speed dynamo of a series regulator-magnet therefor in the unbranched portion of the dynamo-circuit, lamps and a storage battery in multiple, an adjustable resistance in the lamp branch, a magnet measuring the lamp-potential, a motor controlled by said magnet and operating connections between said motor and the said resistance.

17. The combination with a variable-speed dynamo of lamps and a storage battery in multiple, a regulator for the dynamo, a series magnet in the unbranched portion of the circuit controlling the said regulator, an adjustable resistance in the lamp branch and a shunt-magnet measuring the lamp-potential and controlling the adjustment of said resistance.

18. The combination with electric lamps and a storage battery in multiple of a dynamo simultaneously operating the lamps and charging the battery, a series regulator-magnet for the dynamo in the unbranched portion of the main circuit and a distributer on the line adjusting the division of the current between lamps and battery according to the relation of the counter electromotive force of the battery to the electromotive force applied to the lamps.

19. The combination with electric lamps and a storage battery in multiple, of a dynamo charging the battery and operating the lamps simultaneously, a series regulator-magnet for the dynamo holding the current at an amount adequate for both charging the battery and operating the lamps at the same time, an adjustable resistance in the lamp branch in series with the lamps and a controller for said resistance dependent on the relation of the counter electromotive force of the battery to the applied electromotive force on the lamps.

20. The combination with electric lamps and a storage battery in multiple of a dynamo charging the storage battery and simultaneously operating the electric lamps, a series regulator-magnet for the dynamo in the unbranched portion of the main circuit, and a distributer for the current comprising an artificial resistance, an operating-motor therefor and a magnet controlling the said motor according to the relation of the counter electromotive force of the battery to the applied electromotive force on the lamps.

In witness whereof I have hereunto set my hand, before two subscribing witnesses, this 2d day of October, 1902.

JAMES F. McELROY.

Witnesses:
WILLIAM A. MORRELL, Jr.,
BEULAH CARLE.